Figure 1:
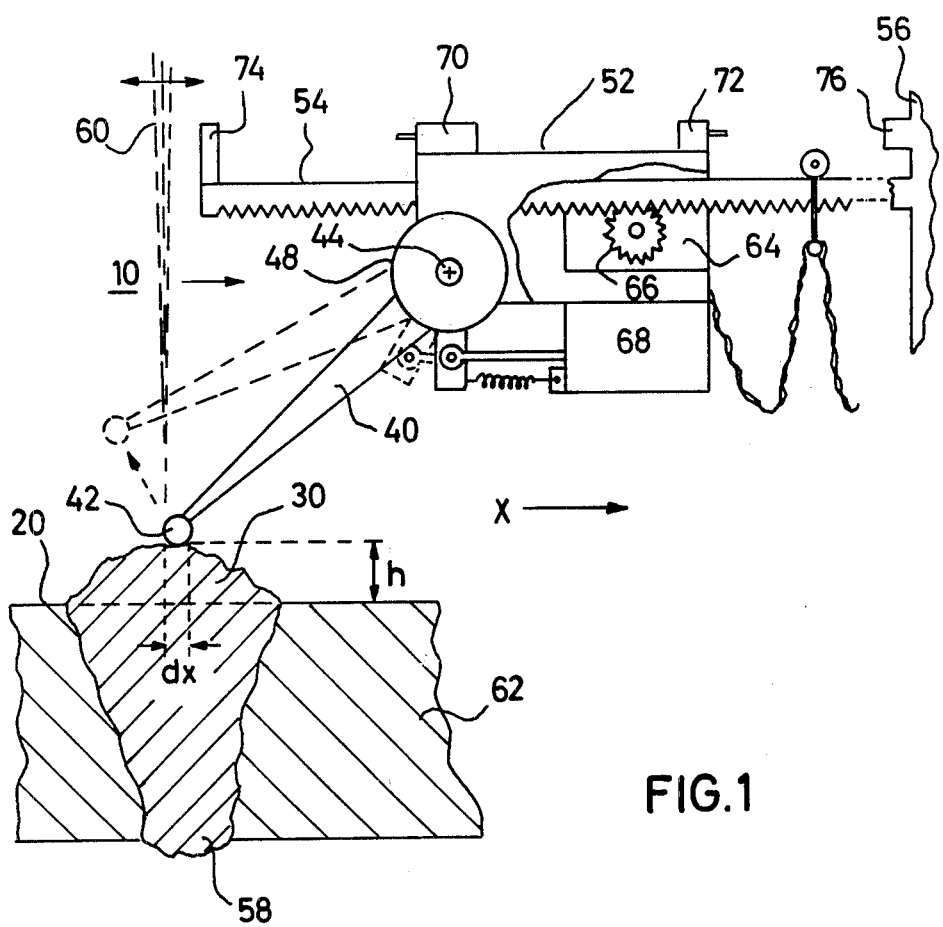

United States Patent [19]

Moench

[11] 4,219,720
[45] Aug. 26, 1980

[54] ENERGY BEAM WELDING WITH FILLER MATERIAL

[75] Inventor: Clauspeter Moench, Grafrath, Fed. Rep. of Germany

[73] Assignee: Steigerwald Strahltechnik GmbH, Munich, United Kingdom

[21] Appl. No.: 922,504

[22] Filed: Jul. 6, 1978

[51] Int. Cl.² .................. B23K 15/00; B23K 26/00; B23K 9/12
[52] U.S. Cl. .............. 219/121 EM; 219/121 EB; 219/121 L; 219/124.34; 219/137.71
[58] Field of Search ......... 219/137.7, 137.71, 121 EB, 219/121 EM, 124.34, 121 LM, 121 L

[56] References Cited

U.S. PATENT DOCUMENTS

| | | | |
|---|---|---|---|
| 3,612,818 | 10/1971 | Bechtle et al. | 219/137.71 |
| 3,855,446 | 12/1974 | Kotova et al. | 219/137.71 X |

FOREIGN PATENT DOCUMENTS 1270708 6/1968 Fed. Rep. of Germany .
2634342 2/1978 Fed. Rep. of Germany ... 219/121 EM Primary Examiner—Roy N. Envall, Jr.
Assistant Examiner—Keith E. George
Attorney, Agent, or Firm—Brumbaugh, Graves, Donohue & Raymond

[57] ABSTRACT

In automatic energy beam welding, as electron beam welding, of workpiece edges which form a gap of varying width along the weld line, the amount of filler material needed for making up for the volume of the gap is determined by probing the size of the solidified weld bead at a surface of the workpiece and the rate of supply of filler material to the welding zone is controlled on the basis of the result of such determination such that the size is maintained between predetermined limits.

5 Claims, 2 Drawing Figures

ENERGY BEAM WELDING WITH FILLER MATERIAL

This invention relates to beam welding with filler material.

For the automatic electron beam welding with filler material of workpieces which form a gap of varying width along the welding line because of inaccurate preparation of their edges it has been proposed, in German Auslegeschrift No. 1,270,708 (based on U.S. Ser. No. 217,136 filed Aug. 15, 1962) a process of electron-beam welding joints of poor accuracy, i.e., having varying gap width, by introducing filler material at a rate controlled by a gap sensing system. Since the width of the gap is sensed at the workpiece surface, the result is no accurate measurement of the cross-sectional area of the gap since the width of the gap may vary not only in the direction of the length of the gap but also in the direction of the depth of the gap, i.e., in the direction of the electron beam. The problem then arises of adapting the rate of the supply of filler material which may consist of wire or metal sheet to the varying gap width in order to avoid the overlying weld bead sinking in or too great an increase in the height thereof.

The present invention relates to a method of obtaining a measure of the amount of filler material which must be supplied to the welding zone during the joining, by beam welding, e.g., electron beam welding, of the edges of two workpieces separated by a gap the width of which varies in an irregular manner as it is usual with workpieces of greater thicknesses, e.g., 50 to 60 mm and more. It is generally not feasable or at least not economical to maschine the workpiece edges to be joined so that they abut continuously or form a gap of constant width. Thus, filler material must be supplied to the welding zone and the amount of filler material supplied to each increment of the gap length must be controlled so that the volume of the gap is made up by the filler material supplied. It is difficult to measure the width of the gap in advance of the welding zone (which is moved along the gap for the reasons stated above. Thus, the present invention proposes to measure the height or cross-sectional area of the solidified weld bead, at least above the level or surface of the workpieces being joined, preferably immediately after the solidification has occurred, i.e. a short distance behind the welding zone. The measurement may be effected by means of a mechanical probe as will be described. Such a proceeding is practical since the gap width, or better the cross-sectional area of the gap which must be made up by filler material, does not vary abruptly and since an exactly constant height of the solidified bead is in most cases not required.

The cross-sectional area of the upper and or rear bead or portion of the seam can be measured by a mechanical probe which is periodically drawn across the solidified seam, or by other means, e.g., an inductive probe which may consist of a solenoid coil comprising a rod-shaped magnetic core which is oscillated transversely at a short distance above the seam and which is energized by an alternating current, so that the inductive reactance of the solenoid coil varies with a distance between the front face of the magnetic core and the probed surface area of the bead.

Since, in particular in the case of large workpiece thickness, measurement of the gap width prior to welding is especially difficult, the present invention starts from the idea of measuring the cross-sectional area or simply the height of the overlying weld bead immediately after solidification of the melt. Since it is not important to obtain an absolutely constant cross-sectional area of the overlying bead, but it is only important to keep this area between certain lower and upper limits, it is sufficient to control the supply of filler material after the result of the measurement of the cross-sectional area of the overlying bead which is described hereinafter in such manner that the rate of supply can be increased (or reduced) when a certain minimum value (or maximum value) of this area is not reached (or is exceeded).

Moreover, this minimum or maximum value must be so chosen that it incorporates sufficient reserve as regards a certain control delay, since in fact the corresponding measurement of area can be carried out only after a certain period of delay between the welding of the joint and the formation of the overlying bead.

Figure 2:
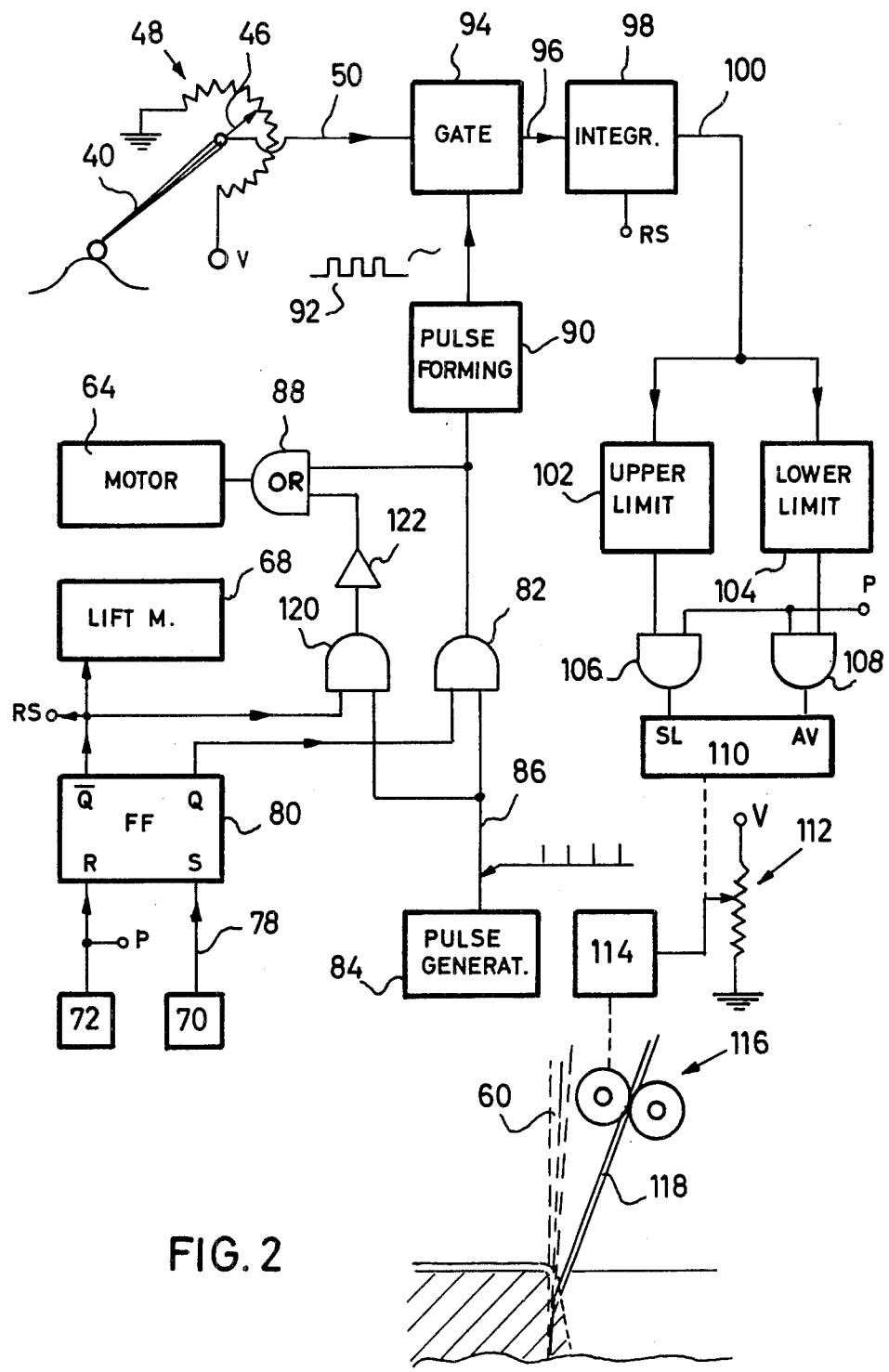

An embodiment of the invention will now be described with reference to the accompanying drawing in which FIG. 1 is a schematic view of a measuring system and a cross-section of a weld seam, and FIG. 2 is a schematic diagram in part in block form of a circuit useful for the system in FIG. 1.

In the embodiment illustrated by the drawing, the basis of the measurement of cross-sectional area is a measuring system 10 which can measure the height h of the overlying bead above the otherwise plane workpiece surface 20 at various points. Such a measuring system may either be based in known manner on a mechanical probing of the height as shown schematically, or, in likewise known manner, the determination of this height h by an inductive method. What is important here, in addition to the combination of such a measuring system 10 with a welding apparatus (in particular an electron beam welding apparatus), is that the measuring system 10 can be moved reproducibly at the same time transversely of the overlying bead 30 in the direction x, the increase in length at any given time dx being detected with the aid of a length measuring device or as described below with reference to FIG. 2.

More specifically, the measuring system 10 includes a probe 40 having an arm with a ball point 42 supported for rotation about an axis 44. The probe 40 is connected to wiper arm 46 of a potentiometer 48. A bias V is supplied to the resistance element of the potentiometer 48, thus, on an output line 50 connected to the wiper 46, a signal is produced which is essentially proportional to the height h (FIG. 1) of the upper weld bead 30. Potentiometer 48 is supported on a carriage 52 which is movable along a horizontal cantilever beam 54 supported on a support element 56 which is moved with a beam gun (not shown) used for producing the weld seam 58, the position being such that the cantilever beam 54 extends in a normal direction to the weld seam 58 at a position such that the probe 40 is adapted to probe the bead 30 shortly after solidification. For the purpose of the following description, it can be assumed that the cantilever beam 54 and an electron beam 60 used for producing the weld seam 58 are stationary while the workpiece 62 is moved in the direction of the viewer out of the plane of FIG. 1.

The ballpoint 42 of the probe 40 is drawn over the weld bead 30 by moving the carriage 52 to the right in FIG. 1 (x-direction). For this purpose, a motor 64 is provided on the carriage 52; the motor 64 having an output axis with a pinion 66 engaging the rack portion of the cantilever beam 54 as shown in FIG. 1. Further, the carriage supports a lift magnet 68 used for lifting the probe off the workpiece during the return movement of the carriage, and end switches 70, 72 which cooperate with stop members 74 and 76, respectively, to sense the end positions of the carriage to initiate the measuring and return cycles as described below.

The construction of the circuit arrangement shown in FIG. 2 will become apparent when reading the following description of the function thereof. It is assumed that the carriage 52 (FIG. 1) is in a measuring cycle start position in which the actuating element of the end switch 70 abuts stop 74. In this position, end switch 70 produces an output signal on line 78 which sets a control flipflop 80. In the set state, Q output of FF 80 is high and enables a first AND gate 82 which, in the enabled state, passes stepping pulses which are continuously produced by a pulse generator 84 on a line 86. The stepping pulses are applied through an OR gate 88 to motor 64 which responds to each stepping pulse received by moving the carriage by an incremental path length dx to the right in FIG. 1. The stepping pulses from the output of AND gate 82 are further supplied to a pulse forming circuit 90 which produces output pulses 92 of constant width each of which corresponding to a length increment dx. The dx pulses 92 are applied to a gate input terminal of a gate circuit 94 having further a signal input connected to line 50 carrying the "height" signal. Thus, on an output line 96 of gate circuit 94, pulses are produced which have a constant width and have an amplitude proportional to h. Thus, the pulses on line 96 have an area which is proportional to the product h·dx. The pulses on line 96 are applied to an integrating circuit 98 which integrates the pulses and produces on an output line 100 a signal which is proportional to the area of the upper weld bead 30 (FIG. 1). This area signal is applied to the inputs of an upper limit threshold circuit 102 and of an lower limit threshold circuit 104 which may be e.g. Schmitt-trigger circuits. Circuit 102 produces an output signal if and when the signal on line 100 exceeds a predetermined upper limit while circuit 104 produces an output signal if and when the signal on line 100 falls under a predetermined lower limit. The output signals of circuits 102 and 104 are applied to one input of a corresponding AND gate 106, and 108, respectively. The other inputs of AND gates 106 and 108 receive one strobe pulse during each cycle. The strobe pulse P may be produced by the output signal of end switch 72 which is produced when the measuring system 10 has completed a measuring run and the end switch 72 is actuated by stop 76.

When the strobe pulse P is produced, any signal produced by circuit 102 or circuit 104 is gated through the associated AND gate 106 or 108 to terminals SL or AV, respectively of stepping motor 110. The stepping motor 110 actuates a speed control device 112 of a feed motor 114 driving a supply device 116 supplying a filler wire 118 to the welding site as schematically shown at the bottom of FIG. 2. The filler wire feeding device may be of known construction and need not to be described in detail.

When the stepping motor 110 receives an input pulse at terminal SL, the speed control device 112 is decremented so that the feeding rate of the filler wire is decreased by a predetermined speed increment. When the stepping motor 110 receives an input pulse at terminal AV, the feeding rate is correspondingly stepped up by an increment.

The signal produced by end switch 72 is further applied to a reset terminal R of flipflop 80. Thus, flipflop 80 switches in the reset state in which output terminal $\bar{Q}$ goes high while Q goes low. AND gate 82 is disabled. Signal $\bar{Q}$ is applied to a first input of an AND gate 120 having a second input connected to the output line 96 of pulse generator 84. The stepping pulses now appearing at the output of AND gate 120 are inverted by an inverter 122 and applied through OR gate 88 to motor 64 which starts rotating in the opposite direction to return the carriage 52 to the measuring cycle start position. Signal $\bar{Q}$ is further applied to the lift magnet 68 and to a reset terminal RS of integrating circuit 98. Lift magnet 68 lifts the probe 40 off the workpiece 62, as shown in dashed lines in FIG. 1, to avoid jamming of the probe 40. The signal at terminal RS resets the integrating circuit 98 to zero.

When the end switch 70 engages the stop 74, flipflop 80 is again set and another measuring cycle as described commences.

An inductive probe, as used in known distance measuring devices, can obviously be used instead of the mechanical probe described.

In some cases, measuring the maximum height of the weld bead 30 rather than the area of the weld bead may be sufficient. In such case, the pulse forming circuit 90 and the gate 94 are omitted and a peak detector is used in place of the integrating circuit 98. A circuit modified in this way will keep the maximum height of the upper weld bead between predetermined upper and lower limits.

The filler material may have essentially the same composition as the workpiece material, or alternatively it may comprise or consist of another material or other materials to modify the properties of the area welded. The filler material may be supplied in any appropriate form, e.g. in form of a wire, a rod, a sheet or band or even in particulate form.

The beam used is preferably a charged particle beam as an electron beam.

The invention is not limited to the embodiment described above but all changes and modifications thereof not constituting departures from the spirit and scope of the invention are intended to be covered by the following claims.

I claim:

1. A method of energy beam welding of two workpiece edges which form a gap the width of which varies in an irregular manner, said method comprising the steps of directing an energy beam to the gap to produce a welding zone, moving the beam relative to the workpiece to produce a weld seam including a solidified weld bead, and supplying a filler material to the welding zone to make up the volume of the gap, wherein the cross-sectional area of the solidified weld bead is determined and the feeding rate of the filler material is adjusted to keep the cross-sectional area of the weld bead between upper and lower limits.

2. The method as claimed in claim 1, wherein the cross sectional area of the weld bead is determined shortly after solidification of the weld bead.

3. The method as claimed in claim 1 or 2 wherein the cross sectional area of the weld bead is determined by periodically drawing a mechanical probe across the solidified bead.

4. An energy beam welding system for welding of two workpiece edges which form a gap, the width of which varies in an irregular manner, said system comprising means for controlling the rate of supply of filler material into the gap, wherein said means comprises:
  probe means for sensing the height (h) of a solidified weld bead produced by the welding process;
  moving means for moving the probe means transversely with respect to said workpiece edges across the weld bead; and
  control means responsive to said probe means, and controlling the rate of supply of filler material, said control means further comprising means for determining the cross-sectional area of the weld bead, the feeding rate being dependent on said cross-sectional area.

5. The system as claimed in claim 4 wherein said probe means comprise a mechanical probe physically contacting the weld bead and means for periodically pulling the probe across the solidified bead.

* * * * *